United States Patent
Chevillard et al.

(10) Patent No.: US 6,441,065 B1
(45) Date of Patent: Aug. 27, 2002

(54) METHOD FOR PREPARATION OF STABLE BITUMEN POLYMER COMPOSITIONS

(75) Inventors: Cyril Chevillard, Dickinson; Paul Buras, Houston; Kevin P. Kelly, Friendswood; James R. Butler, Houston, all of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/712,672

(22) Filed: Nov. 14, 2000

Related U.S. Application Data

(63) Continuation-in-part of application No. 09/389,960, filed on Sep. 3, 1999, now Pat. No. 6,310,122.

(51) Int. Cl.[7] ............................................. C08L 95/00
(52) U.S. Cl. .............................. 524/71; 524/59; 524/68
(58) Field of Search ............................... 524/59, 68, 71

(56) References Cited

U.S. PATENT DOCUMENTS

| | | | |
|---|---|---|---|
| 3,803,066 A | 4/1974 | Petrossi .................... 260/28.5 |
| 4,129,542 A | 12/1978 | Matheson et al. ......... 260/28.5 |
| 4,130,516 A | 12/1978 | Gogle et al. .............. 260/28.5 |
| 4,145,322 A | 3/1979 | Maldonado et al. .......... 524/71 |
| 4,242,246 A | 12/1980 | Maldonado et al. .......... 524/71 |
| 4,412,019 A | 10/1983 | Kraus ........................... 524/71 |
| 4,503,176 A | 3/1985 | Barlow et al. ............... 524/62 |
| 4,740,322 A | 4/1988 | DiBiase et al. ............ 252/47.5 |
| 4,956,500 A | 9/1990 | Vermilion ................. 525/54.5 |
| 5,017,230 A | 5/1991 | Hopkins et al. ......... 106/284.3 |
| 5,078,905 A | 1/1992 | Trinh et al. ............. 252/182.17 |
| 5,120,777 A | 6/1992 | Chaverot et al. ............. 524/62 |
| 5,151,456 A | 9/1992 | Elias et al. .................... 524/60 |
| 5,314,935 A | 5/1994 | Chaverot et al. ............. 524/64 |
| 5,371,121 A | 12/1994 | Bellomy et al. .............. 524/68 |
| 5,382,612 A | 1/1995 | Chaverot et al. ............. 524/60 |
| 5,508,112 A | 4/1996 | Planche et al. ............. 428/489 |
| 5,605,946 A | 2/1997 | Planche et al. ............... 524/68 |
| 5,618,862 A * | 4/1997 | Germanaud et al. .......... 524/68 |
| 5,672,642 A | 9/1997 | Gros ............................. 524/68 |
| 5,710,196 A | 1/1998 | Willard ........................ 524/68 |
| 5,733,955 A | 3/1998 | Schulz et al. ................. 524/69 |
| 5,756,563 A | 5/1998 | Brandolese et al. ........ 523/351 |
| 5,756,565 A | 5/1998 | Germanaud et al. .......... 524/68 |
| 5,773,496 A | 6/1998 | Grubba ......................... 524/68 |
| 5,795,929 A | 8/1998 | Grubba ......................... 524/60 |
| 5,807,911 A | 9/1998 | Drieskens et al. ............ 524/68 |
| 5,880,185 A * | 3/1999 | Planche et al. ............... 524/68 |
| 6,087,420 A * | 7/2000 | Planche et al. ............... 524/59 |
| 6,133,351 A | 10/2000 | Hayner ........................ 524/62 |
| 6,153,004 A | 11/2000 | Hayner ....................... 106/274 |
| 6,310,122 B1 | 10/2001 | Butler et al. .................. 524/60 |

OTHER PUBLICATIONS

Asphalt Institute, Superpave Performance Graded Asphalt Binder Specification and Testing, 1997 Printing, pp 43–65.

* cited by examiner

*Primary Examiner*—Peter Szekely
(74) *Attorney, Agent, or Firm*—Roberts, Abokhair & Mardula

(57) ABSTRACT

The present invention provides a method for preparing an asphalt and thermoplastic elastomer composition. The process comprises preparing a crosslinking elastomer concentrate that is added to a heated asphalt cut in a stirred tank and then aged to improve SHRP high temperature grading. The crosslinking elastomer concentrate is prepared by adding thermoplastic elastomer and crosslinking agents to a suitable carrier oil, preferably an aromatic oil such as Hydrolene H series. This concentrate is maintained at a temperature that promotes association between the crosslinking agents and the elastomer for a time sufficient for association to substantially complete. In one embodiment, the associating time is in excess of 2 hours up to 24 hours. The asphalt is heated to a temperature sufficient to allow the stirring of the asphalt in the tank. The crosslinking thermoplastic elastomer concentrate is added to the asphalt while continuing to stir the asphalt. The mixture is stirred at a speed and for a period of time sufficient to increase the distribution of the elastomer into the asphalt. Stirring is continued for a period of time sufficient to improve the distribution of the crosslinking thermoplastic elastomer in the asphalt. The composition is then aged as a liquid for 12 to 48 hours to increase the SHRP high temperature grade.

20 Claims, No Drawings

METHOD FOR PREPARATION OF STABLE BITUMEN POLYMER COMPOSITIONS

CROSS REFERENCES TO RELATED APPLICATIONS

This application is a continuation-in-part of a U.S. Pat. No. 6,310,122, filed Sep. 3, 1999, Ser. No. 09/389,960 which has the title STABLE BITUMEN POLYMER COMPOSITIONS and further has Kevin P. Kelly and James R. Butler as commonly named inventors.

This application claims priority under 35 U.S.C. 120 of U.S. Pat. No. 6,310,122, Ser. No. 09/389,960 and contents of U.S. Pat. No. 6,180,697 are incorporated herein as if set forth in full.

BACKGROUND OF THE INVENTION

This invention is directed to bitumen compositions, which are prepared from bitumen, polymers such as copolymers of styrene and a conjugated-diene, and defined amounts of crosslinking agents such as sulfur. The bitumen compositions described herein are useful in industrial applications; such as in hot mix asphalts useful in preparing aggregates for road paving.

The use of bitumen (asphalt) compositions in preparing aggregate compositions (bitumen+rock) useful as road paving material is complicated by at least three factors, each of which imposes a serious impediment to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications designate a bitumen (asphalt) product, for example, AC-20R as meeting defined parameters relating to properties such as viscosity, toughness, tenacity and ductility (see Table 1). Each of these parameters define a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road can occur, including permanent deformation, thermally induced cracking and flexural fatigue. This damage greatly reduces the effective life of paved roads.

In this regard, it has long been recognized that the properties of conventional bitumen compositions can be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions can be increased by the addition of crosslinking agents such as sulfur, frequently in the form of elemental sulfur. It is believed that the sulfur chemically couples the polymer and the bitumen through sulfide and/or polysulfide bonds. The addition of extraneous sulfur is required to produce the improved stability, even though bitumens naturally contain varying amounts of native sulfur.

Thus, U.S. Pat. No. 4,145,322, issued Mar. 20, 1979 to Maldonado et al., discloses a process for preparing a bitumen-polymer composition consisting of mixing a bitumen, at 266–446° F. (Fahrenheit)(130–230° C. (Celsius)), with 2 to 20% by weight of a block copolymer, having an average molecular weight between 30,000 and 300,000, with the theoretical formula $S_x$-$B_y$, in which S corresponds to styrene structure groups and B corresponds to conjugated diene structure groups, and x and y are integers. The resulting mixture is stirred for at least two hours, and then 0.1 to 3% by weight of sulfur relative to the bitumen is added and the mixture agitated for at least 20 minutes. The preferred quantity of added sulfur cited in this patent is 0.1 to 1.5% by weight with respect to the bitumen. The resulting bitumen-polymer composition is used for road coating, industrial coating, or other industrial applications.

Similarly, U.S. Pat. No. 4,130,516, issued Dec. 19, 1978 to Gagle et al., discloses an asphalt (bitumen) polymer composition obtained by hot-blending asphalt with 3 to 7% by weight of elemental sulfur and 0.5 to 1.5% by weight of a natural or synthetic rubber, preferably a linear, random butadiene/styrene copolymer. U.S. Pat. No. 3,803,066, issued Apr. 9, 1974 to Petrossi, also discloses a process for preparing a rubber-modified bitumen by blending rubber, either natural or synthetic, such as styrene/butadiene rubber, with bitumen at 293–365° F. (145–185° C.), in an amount up to 10% by weight based on the bitumen, then adjusting the temperature to 257–320° F. (125–160° C.), and intimately blending into the mix an amount to sulfur such that the weight ratio of sulfur to rubber is between 0.3 and 0.9. A catalytic quantity of a free-radical vulcanization-accelerator is then added to effect vulcanization. This patent recites the critical nature of the sulfur to rubber ratio, and teaches that weight ratios of sulfur to rubber of less than 0.3 gives modified bitumen of inferior quality.

Although polymer-modified bitumen compositions are known, these previously described compositions are not necessarily useful for road paving applications. For example, mixing NorthWest paving asphalt having an initial viscosity of 682 poise at 140° F. (60°C.) with 3.6 weight percent Kraton®-4141, a commercially available styrene-butadiene tri-block copolymer which contains 29 weight percent plasticizer oil, and 0.25% sulfur gives a modified-asphalt composition with a viscosity of 15,000 poise at 140° F. (60° C.). This viscosity, however, greatly exceeds the acceptable viscosity range set by the widely used AC-20R specification for paving asphalt. This specification, issued by the Federal Highway Administration, requires bitumen compositions to have a viscosity in the range of 1600–2400 poise at 140° F. (60° C.). Thus, the modified bitumen compositions produced by the procedures of U.S. Pat. No. 4,145,322 using Kraton®-4141 would be unacceptable for use in road paving under the AC-20R specification.

The second factor complicating the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it can still be employed for its intended purpose.

The third factor complicating the use of bitumen compositions concerns the use of volatile solvents in such compositions. Specifically, while such solvents have been heretofore proposed as a means to fluidize bitumen-polymer compositions containing relatively small amounts of sulfur which compositions are designed as coatings (Maldonado et al., U.S. Pat. No. 4,242,246), environmental. concerns restrict the use of volatile solvents in such compositions. Moreover, the use of large amounts of volatile solvents in bitumen compositions may lower the viscosity of the resulting composition so that it no longer meets viscosity specifications designated for road paving applications. In addition to the volatile components, reduction of other emissions during asphalt applications becomes a target. For example, it is desirable to reduce the amount of sulfur compounds that are emitted during asphalt applications.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for surface coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or in a very thin bituminous mix, or as a thicker structural layer of bituminous mix of asphaltic concrete, is enhanced if these binders possess the requisite properties such as desirable levels of elasticity and plasticity.

Previously, various polymers have been added to asphalts to improve physical and mechanical performance properties. Polymer-modified asphalts are routinely used in the road construction/maintenance and roofing industries. Conventional asphalts often do not retain sufficient elasticity in use and, also, exhibit a plasticity range that is too narrow for use in many modem applications such as road construction. It is known that the characteristics of road asphalts and the like can be greatly improved by incorporating into them an elastomer-type polymer which may be one such as butyl, polybutadiene, polyisoprene or polyisobutene rubber, ethylene vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and typically have higher softening point, increased viscoelasticity, enhanced force under strain, enhanced strain recovery, and improved low temperature strain characteristics.

The bituminous binders, even of the bitumen/polymer type, which are employed at the present time in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant that promotes crosslinking of the polymer molecules until the desired asphalt properties are met. This reactant typically is sulfur in a form suitable for reacting. Such current processes are discussed in various patents such as U.S. Pat. No. 4,145,322 Maldonado); U.S. Pat. No. 5,371,121 (Bellomy); and U.S. Pat. No. 5,382,612 (Chaverot), all of which are hereby incorporated by reference.

However, the cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

One result of the high viscosities experienced at increased polymer concentrations is that it makes emulsification of the asphalt difficult. As is known in the art and used herein, emulsification of asphalt refers to forming an emulsion of asphalt and water. Asphalt emulsions are desirable in many applications because the emulsion may be applied at lower temperatures than hot-mix asphalts because the water acts as a carrier for the asphalt particles.

For example, hot-mix asphalts, mixes of asphalt, aggregate, and a single polymer, commonly are applied at a temperature of 350° F. to 450° F. (77° C. to 232° C.) to achieve the requisite plasticity for application. In comparison, an asphalt emulsion typically may be applied at 130° F. to 170° F. (54° C. to 77° C.) to achieve the same working characteristics. Once applied, the water evaporates, leaving the asphalt. Also, emulsified asphalt products generally do not use or release the environmentally-harmful volatile organic compounds normally associated with asphalts diluted with light carrier solvents such as diesel fuel, naphtha, and the like. Emulsification basically requires that the asphalt and any desired performance-enhancing additives be combined with an emulsifying agent in an emulsification mill along with about 20 to 40 percent by weight of water. However, high polymer loading in an asphalt produces high viscosities and melting points, making emulsification of the polymer-asphalt composition difficult. Thus, emulsification is limited to lower polymer concentrations not producing excessively viscous (stiff) working asphalt-polymer fluids.

The bitumen/polymer compositions are prepared in practice at polymer contents range from about 2% to 6% by weight of bitumen depending on the nature and the molecular weight of the polymer and the quality of the bitumen. Gelling of the bitumen/polymer composition, which is observed fairly frequently during the preparation of the said composition or while it is stored, occurs as soon as the polymer content of this composition exceeds the above-mentioned threshold. It is thus difficult, in practice, to produce non-gellable bitumen/polymer compositions with a high polymer content, which would act as bitumen/polymer concentrates, and are more economical to prepare and to transport than bitumen/polymer compositions with a lower polymer content, and which could be diluted at the time of use, by addition of bitumen, in order to obtain the corresponding bitumen/polymer binders with a lower polymer content which are usually used to make coatings.

In view of the above, bitumen compositions, which simultaneously meet the performance criteria required for road paving, and which are substantially free of volatile solvent would be advantageous. Additionally, viscosity stable bitumen compositions would be particularly advantageous. Further, a method for efficiently introducing the polymer into the bitumen composition would be desirable. In preparing the composition, significant mixing is needed to insure the uniform addition of both the polymer and any crosslinking agents. The crosslinking agents are added as a dry powder and mixed with the asphalt compositions.

TABLE 1

Properties of Various Asphalt Grades

| TEST | AASHTO M-226 | | | | | |
|---|---|---|---|---|---|---|
| | AC 2.5 | AC 5 | AC 10 | AC 20 | AC 30 | AC 40 |
| Viscosity@140° F., poise (AASHTO T-202) | 250 ± 50 | 500 ± 100 | 1000 ± 200 | 2000 ± 400 | 3000 ± 600 | 4000 ± 800 |
| Viscosity @275° F.; cSt, minimum (AASHTO T-201) | 125 | 175 | 250 | 300 | 350 | 400 |
| Pen. @77° F.; minimum AASHTO t-49) | 220 | 140 | 80 | 60 | 50 | 40 |
| Flash Point, COC Minimum ° F. | 325 | 350 | 425 | 450 | 450 | 450 |
| Ductility After TFOT (AASHTO T-179) @77° F., 5 cm/min, minimum | 100 | 100 | 75 | 50 | 40 | 25 |
| Viscosity After TFOT (AASHTO T-179) @140° F., poise minimum | 1000 | 2000 | 4000 | 8000 | 12000 | 16000 |

| TEST | AR1000 | AR2000 | AR4000 | AR8000 | AR16000 |
|---|---|---|---|---|---|
| Viscosity@140° F., poise (AASHTO T-202) | 1000 ± 250 | 2000 ± 500 | 4000 ± 1000 | 8000 ± 2000 | 16000 ± 4000 |
| Viscosity@275° F., cSt, minimum (AASHTO T-201) | 14 | 200 | 275 | 400 | 500 |
| Pen. @77° F., minimum (AASHTO T-49) | 65 | 40 | 25 | 20 | 20 |
| Percent of Original Pen. @77° F., minimum | B | 40 | 45 | 50 | 52 |
| Ductility @77° F., minimum, 5 cm/min | 100 | 100 | 75 | 75 | 75 |

As can be seen from the above, the art is replete with methods to improve the mixing of asphalt and polymer compositions. The needed elements for the commercial success of any such process include keeping the process as simple as possible, reducing the cost of the ingredients, and utilizing available asphalt cuts from a refinery without having to blend in more valuable fractions. In addition, the resulting asphalt composition must meet the above-mentioned governmental physical properties and environmental concerns. Thus, it is a target of the industry to reduce the cost of the polymers and crosslinking agents added to the asphalt without sacrificing any of the other elements.

SUMMARY OF THE INVENTION

The present invention provides a method for preparing an asphalt and thermoplastic elastomer composition that is advantageous for concentrations of elastomer greater than 2 percent by weight of asphalt concrete. The method comprises preparing a crosslinked elastomer concentrate that is added to a heated asphalt cut in a stirred tank and then aged to improve the Superpave Performance Graded Binder (SHRP) high temperature grading. The crosslinked elastomer concentrate is prepared by adding thermoplastic elastomer and crosslinking agents to a suitable carrier oil, preferably an aromatic oil. This concentrate is maintained at a temperature that promotes association between the crosslinking agents and the elastomer for a time sufficient for association to substantially complete. In one embodiment, the associating time is in excess of 2 hours up to 24 hours. The asphalt is heated to a temperature sufficient to allow the stirring of the asphalt in the tank. The cross-linked thermoplastic elastomer concentrate is added to the asphalt while continuing to stir the asphalt. The mixture is stirred at a speed and for a period of time sufficient to increase the distribution of the elastomer into the asphalt. Stirring is continued for a period of time sufficient to improve the distribution of the crosslinked thermoplastic elastomer in the asphalt. The composition is then aged as a liquid for 12 to 48 hours to increase the SHRP high temperature grade. The crosslinking agents utilized in one embodiment comprised zinc 2-mercaptobenzothiazole (ZMBT): Sulfur (S) in a 1:3 ratio. Other crosslinking agents can also be utilized.

DESCRIPTION OF THE INVENTION

Methods of preparing stable bitumen polymer compositions have been disclosed in U.S. Pat. No. 6,180,697, the contents of which are incorporated herein as if set forth in full. The method steps therein disclose addition of the crosslinking agent to a heated asphalt/thermoplastic elastomer mixture either directly or in an oil dispersion. It is desirable to obtain similar beneficial results by other methods.

As used herein, the term "bitumen" (sometimes referred to as "asphalt") refers to all types of bitumens, including those that occur in nature and those obtained in petroleum processing. The choice of bitumen will depend essentially on the particular application intended for the resulting bitumen composition. Preferred bitumens have an initial viscosity at 140° F. (60° C.) of about 600 to 3000 poise depending on the grade of asphalt desired. The initial penetration range of the base bitumen at 77° F. (25° C.) is 50 to 250 dmm, preferably 75 to 150 dmm, when the intended use of the copolymer-bitumen composition is road paving. Bitumens that do not contain any added copolymer, sulfur, etc., are sometimes referred to herein as a "base bitumen".

As used herein, the term "volatile solvent" refers to a hydrocarbon solvent which has a distillation point or range which is equal to or less than 350° C. Such solvents are known to vaporize to some extent under ambient conditions and, accordingly, pose environmental concerns relating to hydrocarbon emissions.

The term "substantially free of volatile solvent" means that the complete (final) bitumen composition contains less than about 3.5 weight percent of volatile solvent. Preferably, the bitumen composition contains less than about 2 weight percent of volatile solvent and more preferably, less than about 1 weight percent of volatile solvent.

"Conjugated-dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units which copolymers are represented by the formula:

$S_x$-$D_y$-$S_z$ where D is a conjugated-diene, S is styrene, and x, y and z are integers such that the number average molecular weight of the copolymer is from about 30,000 to about 300,000. These copolymers are well known to those skilled in the art and are either commercially available or can be prepared from methods known per se in the art. Preferably, such tri-block copolymers are derived from styrene and a conjugated-diene, wherein the conjugated-diene is butadiene or isoprene. Such copolymers preferably contain 15 to 50 percent by weight copolymer units derived from styrene, preferably 17 to 35 percent derived from styrene, more preferably 20 to 31 percent derived from styrene, the remainder being derived from the conjugated diene. These copolymers preferably have a number average molecular weight range between 50,000 and 200,000, more preferably between 80,000 and 180,000. The copolymer can employ a minimal amount of hydrocarbon solvent in order to facilitate handling. Examples of suitable solvents include plasticizer solvent that is a non-volatile aromatic oil. However, when the hydrocarbon solvent is a volatile solvent (as defined above), care should be taken to ensure that the amount of solvent contained in the final bitumen composition is less than about 3.5 weight percent.

The term "sulfur" refers to elemental sulfur in any of its physical forms or any sulfur donating compound. Sulfur donating compounds are well known in the art and include various organic compositions or compounds that generate sulfur under the mixing or preparation conditions of the present invention. Preferably, the elemental sulfur is in powder form known as flowers of sulfur.

The term "desired Rheological Properties" refers to bitumen compositions having a viscosity at 140° F. (60° C.) from 400 to 4000 poise before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging. Each of these desired Rheological Properties are necessary parameters in meeting the AC-20(R) specifications for bitumen compositions suitable for use as road pavement material (See Table 1).

Viscosity measurements are made by using ASTM test method D2171. Ductility measurements are made by using ASTM test method D113. Toughness and tenacity measurements are made by a Benson Method of Toughness and Tenacity, run at 20 inches/minute (50.8 cm/minute) pull rate with a ⅞inch (2.22 cm) diameter ball.

By "storage stable viscosity" it is meant that the bitumen composition shows no evidence of skinning, settlement, gelation, or graininess and that the viscosity of the composition does not increase by a factor of four or more during storage at 325°+/−5° F. (163°+/−2.8° C.) for seven days. Preferably the viscosity does not increase by a factor of two or more during storage at 325° F. (163° C.) for seven days. More preferably the viscosity increases less than 50% during seven days of storage at 325° F. (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially unblown or unoxidized solid or semi-solid materials at room temperature that gradually liquify when heated. Its predominant constituents are bitumens, which may be naturally occurring or obtained as the residue of refining processing. The asphalt cements are generally characterized by a penetration (PEN, measured in tenths of a millimeter, dmm) of less than 400 at 25° C., and a typical penetration is between 40 and 300 (ASTM Standard, Method D-5). The viscosity of asphalt cement at 60° C. is more than about 65 poise. Asphalt cements are often defined in terms specified by the American Association of State Highway Transportation Officials (AASHTO) viscosity or AR viscosity system. Two sets of typical specifications are shown in Table 1.

The asphalt terms used herein are well known to those skilled in the art. For an explanation of these terms, reference is made to the booklet SUPERPAVE Series No. 1 (SP-1), 1997 printing, published by the Asphalt Institute (Research Park Drive, P.O. Box 14052, Lexington, Ky. 40512-4052), as well as AASHTO Provisional Standard MP-1, AASHTO test methods PP1, T240, T44, T48, TP1, TP3, TP5 and ASTM test method D4402. For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. This is used to predict permanent deformation or rutting and fatigue cracking. Bending Beam Rheometers (BBR) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet and AASHTO Provisional Standard MP-1. The asphalt compositions are given performance grades, for example, PG 64-22. The first number, 64, represents the average 7-day maximum pavement design temperature in ° C. The second number, −22, represents the minimum pavement design temperature in ° C. Other requirements of each grade are as required by AASHTO Provisional Standard MP-1. For example, the maximum value for the PAV-DSR test (° C.) for PG 64-22 is 25° C.

One of the methods commonly utilized in the industry to standardize the measure or degree of compatibility of the rubber with the asphalt is referred to as the compatibility test. The test comprises the mixing of the rubber and asphalt with all the applicable additives, such as the crosslinking agents. The mixture is placed in tubes, usually made of aluminum or similar material, referred to as cigar tubes or toothpaste tubes. These tubes are about one inch in diameter and about fifty centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut in one thirds, three equal sections. The softening point of the top one third is compared to the softening point of the bottom section. This test gives an indication of the separation or compatibility of the rubber within the asphalt. In non-compatible asphalt, rubber generally rises to the top of the tube. The smaller the difference in softening point between the top and bottom sections, the more compatible are the rubber and asphalt. The twenty-four hours test is used as a common comparison point.

This invention teaches the preparation of asphalt and polymer compositions having properties that comply with AASHTO or ASTM standards for grade AC-20. In one embodiment, the invention includes the method for preparing asphalt and polymer compositions by first preparing a crosslinking agent/elastomer concentrate by adding thermoplastic elastomer, preferably a styrene-butadiene polymer, and crosslinking agents to a suitable carrier oil and allowing the mixture to age from in excess of 2 hours to 24 hours. The amount of elastomer in the concentrate is preferably not greater than 18% by weight. The present invention is particularly applicable to the preparation of elastomer concentrates having an elastomer content from 8 to 18% by weight.

Suitable carrier oils can be both low aromatic and high aromatic oils. It is noted that improved results occur with aromatic oils comprise greater than 50% by weight combined naphthene and polar aromatic fractions (ASTM D4124 test), preferably greater than 72% by weight, and most preferably greater than 80% by weight aromatic fractions. The crosslinking agents used are preferably elemental sulfur and zinc compounds.

Asphalt is heated in a stirred tank to a temperature sufficient to allow stirring of the asphalt in the tank, preferably at a temperature not greater than 420° F. The elastomer concentrate is added to the tank and stirring is continued for a period of time sufficient to improve the distribution of the concentrate in the asphalt. The resultant composition is then aged for 12 to 24 hours to improve the SHRP high temperature grade, preferably at a temperature of 300° F. to 350° F.

Another embodiment of the invention also teaches the preparation of an asphalt composition having properties that comply with or exceed Federal standards for grade AC-20. In accordance with this embodiment, the temperature is lowered for the aging of the final composition. The similar method comprises first preparing a crosslinking elastomer concentrate by adding thermoplastic elastomer, preferably a styrene-butadiene polymer, and crosslinking agents to a suitable carrier oil and allowing the mixture to age from in excess of 2 hours to 24 hours. The amount of elastomer in the concentrate is preferably not greater than 18% by weight.

Suitable carrier oils can be both low aromatic and high aromatic oils. Preferably the carrier oil comprises greater than 50% by weight combined naphthene and polar aromatic fractions (ASTM D4124 test), preferably greater than 72% by weight, and most preferably greater than 80% by weight aromatic fractions. The crosslinking agents used are preferably elemental sulfur and zinc compounds.

Asphalt is heated in a stirred tank to a temperature of 360° F. to 400° F. The crosslinking elastomer concentrate is added to the tank and stirring is continued for a period of time sufficient to improve the distribution of the concentrate in the asphalt. The temperature is then reduced to 300° F. to 330° F. and the resultant composition is then aged for 12 to 24 hours to improve the SHRP high temperature grade.

Other embodiments of this invention, which can be made to comply with AASHTO standards for grade AC-20, prepare the crosslinking elastomer concentrate by initially dissolving the elastomer. One such embodiment, first prepares a solution of elastomer concentrate by adding thermoplastic elastomer, preferably a styrene-butadiene polymer, to a suitable carrier oil in a stirred tank. Stirring is continued while heating the oil and thermoplastic elastomer for sufficient time and temperature to dissolve more than 80% by weight of the thermoplastic elastomer. Crosslinking agents are added to the solution to form a dispersion of crosslinking agents in the elastomer solution. This solution is then preferably aged from in excess of 2 hours to 24 hours. The amount of elastomer in the concentrate is preferably not greater than 18% by weight, and more preferably from 8% to 18% by weight. The procedure continues as described in the procedure above.

Stirring temperatures depend on the viscosity of the asphalt and can range up to 500° F. Asphalt products from refinery operations are well known in the art. For example, asphalts typically used for this process are obtained from deep vacuum distillation of crude oil to obtain a bottom product of the desired viscosity or from a solvent deasphalting process that yields a demetalized oil, a resin fraction and an asphaltene fraction. Some refinery units do not have a resin fraction. These materials or other compatible oils of greater than 450° F. flash point may be blended to obtain the desired viscosity asphalt.

Rubbers or thermoplastic elastomers suitable for this application are well known in the art as described above. For example, Finaprene® SBS products available from ATOFINA Petrochemicals, are suitable for the applications of the present invention. This example is not limiting for the technology, which can be applied to any similar elastomer product produced from styrene and butadiene.

Crosslinking agents for asphalt applications are well known in the art. As examples, U.S. Pat. No. 5,017,230 to Hopkins et al., U.S. Pat. No. 5,756,565 to Germanaud et al., U.S. Pat. No. 5,795,929 to Grubba, and U.S. Pat. No. 5,605,946 to Planche et al. disclose, and refer to various other patents that disclose various crosslinking compositions. For various reasons including costs, environmental impact, and ease of use, elemental sulfur with organic zinc compounds are preferred. Most crosslinking formulations use elemental sulfur due to cost. In special situations, the sulfur can be added with a sulfur donor such as dithiodimorpholine, zinc thiuram disulfide, or any compound with two or more sulfur atoms bonded together. The zinc is added as zinc 2-mercaptobenzothiazole, zinc tetraalkylthiuram disulfide, zinc oxide, zinc dialkyl-2-benzosulfenamide, or other suitable zinc compound or mixtures thereof. The present invention is particularly useful in the addition of normally solid or non-liquid crosslinking agents. These crosslinking agents are normally sold in powder or flake form.

U.S. Pat. No. 6,180,697 discloses the method of preparing asphalt concrete compositions by first adding the elastomer to the base bitumen and then adding crosslinking agents in either an oil dispersion or an aqueous emulsion. The crosslinking system disclosed includes the zinc 2-mercaptobenzothiazole:zinc oxide:sulfur crosslinking system (ZMBT:ZnO:S). The oil dispersion therein disclosed includes the use of Hydrolene H180T and Hydrolene SP125 oils (formerly Sunpave 125).

The present invention presents a method of combining compounds for preparing asphaltic concretes useful for road paving applications. First a concentrate of crosslinking agent and an elastomer is formed by combining an elastomer and crosslinking agents in an oil carrier. Sufficient time, temperature and stirring are maintained until the cross-linking agents are fully associated with the elastomer. Depending upon the temperature, the time will vary although times in excess of 2 up to hours to 24 hours are typical. The carrier oil is selected to be compatible with the elastomer and base bitumen, preferably an aromatic oil such as Hydrolene H180T from Sunoco, Inc. is selected. The amount of carrier oil that is used is determined from the viscosity and storage requirements for the oil dispersion. Typically, 50% to 90% by weight of carrier oil is used.

In preferred embodiments an aromatic oil is used. Aromatic oils are those that comprise more than 50% by weight of the combined aromatic fractions determined by the ASTM D4124 standard test method. More preferably, the combined fractions of naphthene aromatics and polar aromatics should exceed 72% by weight. For example, Hydrolene H180T comprises 80.9% combined naphthene and polar aromatic fractions.

In one of the preferred embodiments an aromatic oil is used and allowed to dissolve the elastomer prior to the addition of crosslinking agents. The elastomer is first added to heated aromatic oil with high shear stirring. Stirring is continued until the elastomer is substantially dissolved. To this solution the crosslinking agents are added. Sufficient time, temperature and stirring are maintained until the crosslinking agents associate with the elastomer.

Storage and aging stability of the resultant crosslinking elastomer oil dispersion is quite high for dispersions having complete association between the crosslinking agents and elastomer. Pumpability can be further improved at time of use by increasing the amount of carrier oil or heating the oil dispersion.

Once the crosslinking elastomer concentrate is prepared, it is added to heated and stirred asphalt. Stirring temperatures depend on the viscosity of the asphalt and can range up to 500° F. Up to 12% by weight of asphalt of crosslinking elastomer is added. This 12% is exclusive of the carrier oil. For example, if the elastomer concentrate contains 84% by weight of carrier oil (16% elastomer), and a 4% elastomer concentration in the final product is desired, then 25% of elastomer concentrate is added to 75% asphalt. The amount of crosslinking elastomer concentrate that is added is determined from the desired SHRP properties. One preferred embodiment includes 4% by weight of asphalt of the crosslinking elastomer.

Tests were run comparing methods of forming the final asphalt concrete product to the method of the invention. Results obtained are given in Tables 2 through 5.

Method A: The SBS elastomer (Finaprene® FP411), Hydrolene H180T oil, and crosslinking agents were added to a mixing tank containing molten asphalt at 380° F. with stirring at 2500 RPM for 10 minutes. Stirring was continued for 1 hour (either at high shear of 2500 RPM or at low shear of 500 RPM). The material was allowed to stand without stirring for 24 hours at 320° F. Samples were taken for compatibility testing and SHRP grading. In the compatibility test, the softening point of the top third and the bottom third of the asphalt sample must be within 4° F. of one another for the asphalt rubber to be considered compatible. Elemental sulfur and zinc 2-mercaptobenzothiazole (ZMBT) were used as the crosslinking agents.

Method B: The oil dispersion is formed by first adding SBS elastomer (Finaprene® FP411) to Hydrolene H180T oil in a mixing tank at 380° F. with mixing at 2500 RPM for 3 hours in a concentration of elastomer of up to 18% by weight of the mixture. The crosslinking agents are then added and stirring is continued at 2500 RPM for 1 hour to ensure good dispersion. Next, this material is allowed to stand without stirring for 24 hours at 320° F. to allow for substantial completion of the associating between the crosslinking agents and the elastomer. This crosslinking elastomer concentrate is then added to a mixing tank containing molten asphalt at 380° F. with stirring at 2500 RPM. Stirring was continued for 2 hours at 2500 RPM. This material was allowed to stand without stirring for the aging period indicated at 320° F. Various aging periods were selected to determine beneficial effects. Samples were taken for compatibility testing and SHRP grading. In the compatibility test, the softening point of the top third and the bottom third must be within 4° F. of one another for the asphalt rubber to be considered compatible. Elemental sulfur and zinc 2-mercaptobenzothiazole (ZMBT) were used as the crosslinking agents.

Finaprene® FP411 was selected due to its high level of incompatibility when used without crosslinking agents (compatibility of 63 degrees F. delta). It is also subject to gelling when too much crosslinking agents are used. The amounts of crosslinking agents initially selected had to be reduced to those concentrations indicated in the tables to prevent gelling (for example, sulfur was reduced from 3% by weight elastomer to 2.25% by weight elastomer).

Low aromatics Hydrolene SP carrier oil was tried in the experiments and found to be inferior as compared to Hydrolene H series oil. The total aromatic fractions per the ASTM D4124 test is 20.5% for Hydrolene SP125 oil tested and 80.9% for Hydrolene H180T oil tested. The higher aromaticity of Hydrolene H180T encouraged crosslinking and association.

What was found is that at low concentrations of thermoplastic elastomer, method B does not yield significant improvement over method A. For example, in Table 2 the results of using the alternate methods with a 2% by weight of asphalt of the elastomer are indicated. Either method yielded a resultant SHRP Grade of PG70-22.

Surprisingly, at higher concentrations of elastomer, the method B demonstrated improved results as shown in Table 5. Method B improved the low temperature PG grading from −16 to −22° C., an improvement of 8° C. Equal high temperature PG grades of 70° C. were obtained. This result will allow better performing products to be formulated with the same materials. Alternately, equally PG graded materials will be possible with reduced amounts of high cost components (i.e. elastomer, carrier oil, crosslinking agents and asphaltenes).

Table 3 and Table 4 show the effects of continued aging on asphalt concrete product from methods A and B. No significant differences were noted for method A, as indicated in Table 4. However, as shown in Table 3, additional aging of method A compositions had a material effect on the SHRP grading high temperature value. With aging, the high temperature value increased from 70° C. to 76° C. This gives a high temperature grade comparable with that of method A. Hence it is seen that method B yields improved SHRP low temperature while any sacrifice of high temperature grade can be compensated for by longer aging periods.

While certain representative embodiments and details have been shown for the purpose of illustrating the subject invention, it will be apparent to those skilled in the art that various changes and modifications can be made therein without departing from the scope of the subject invention.

TABLE 2

|  | Not Aged, Method B | Method A |
|---|---|---|
| Sample number | 958-52 | 958-53 |
| High Density Tower Residua wt % | 25 | 25 |
| AC-30 Asphaltenes wt % | 60 | 60 |
| Subtotal Asphalt wt % | 85 | 85 |
| Hydrolene H180T Oil wt % | 13 | 13 |
| Elastomer FP411 | 2 | 2 |
| Elastomer FP411 - % of Cross-linked Blend | 13.28 | — |
| Crosslinker - ZMBT wt % of Elastomer | 0.75 | 0.75 |
| Crosslinker - ZMBT wt % of Asphalt | 0.015 | 0.015 |
| Crosslinker - S wt % of Elastomer | 2.25 | 2.25 |
| Crosslinker - S wt % of Asphalt | 0.045 | 0.045 |
| Temperature | 380 | 380 |
| Mixer RPM | high shear | low shear |
| Compatibility Test: |  |  |
| Top number Degrees Fahrenheit | 128.1 | 144.4 |
| Compatibility Delta Temp. Degrees F. | 1.8 | 2.2 |
| SHRP Testing: |  |  |
| Binder DSR | 70.3 | 76.7 |
| RTFO DSR | 72 | 75.6 |
| PAV DSR | 21.3 | 25.3 |
| M-value | −14.1 | −12.56 |
| S-value | −15.73 | −15.07 |
| SHRP Grade | PG70-22 | PG70-22 |

TABLE 3

|  | Not Aged, Method B | 24 hour Aging, Method B | 48 hour Aging, Method B |
|---|---|---|---|
| Sample number | 958-54 | 958-57 | 958-60 |
| High Density Tower Residua wt % | 48 | 48 | 48 |
| AC-30 Asphaltenes wt % | 24.2 | 24.2 | 24.2 |
| Subtotal Asphalt wt % | 72.2 | 72.2 | 72.2 |
| Hydrolene H180T Oil wt % | 24 | 24 | 24 |
| Elastomer FP411 | 3.8 | 3.8 | 3.8 |
| Elastomer FP411 - % of Cross-linked Blend | 13.6 | 13.6 | 13.6 |
| Crosslinker - ZMBT wt % of Elastomer | 0.75 | 0.75 | 0.75 |
| Crosslinker - ZMBT wt % of Asphalt | 0.029 | 0.029 | 0.029 |
| Crosslinker - S wt % of Elastomer | 2.25 | 2.25 | 2.25 |
| Crosslinker - S wt % of Asphalt | 0.086 | 0.086 | 0.086 |
| Temperature | 380 | 380 | 380 |
| Mixer RPM | high shear | high shear | high shear |
| Compatibility Test: |  |  |  |
| Top number Degrees Fahrenheit | 143.4 | 143.4 | 143.4 |
| Compatibility Delta Temp. Degrees F. | 0.3 | 0.3 | 0.3 |
| SHRP Testing: |  |  |  |
| Binder DSR | 75.6 | 78 | 78.7 |
| RTFO DSR | 72.9 | 74.1 | 76.6 |
| PAV DSR | 24.6 | 23.1 |  |
| M-value | −14.14 | −15.35 | −13.27 |
| S-value | −15.76 | −15.45 | −14.84 |
| SHRP Grade | PG70-22 | PG70-22 | PG76-22 |

TABLE 4

|  | 24 hour Aging, Method A | 24 hour Aging, Method A | 48 hour Aging, Method A |
|---|---|---|---|
| Sample number | 958-55 | 958-58 | 958-59 |
| High Density Tower Residua wt % | 48 | 48 | 48 |
| AC-30 Asphaltenes wt % | 24.2 | 24.2 | 24.2 |
| Subtotal Asphalt wt % | 72.2 | 72.2 | 72.2 |
| Hydrolene H180T Oil wt % | 24 | 24 | 24 |
| Elastomer FP411 | 3.80 | 3.80 | 3.80 |
| Elastomer FP411 - % of Cross-linked Blend | — | — | — |
| Crosslinker - ZMBT wt % of Elastomer | 0.75 | 0.75 | 0.75 |
| Crosslinker - ZMBT wt % of Asphalt | 0.029 | 0.029 | 0.029 |
| Crosslinker - S wt % of Elastomer | 2.25 | 2.25 | 2.25 |
| Crosslinker - S wt % of Asphalt | 0.086 | 0.086 | 0.086 |
| Temperature | 380 | 380 | 380 |
| Mixer RPM | low shear | high shear | high shear |
| Compatibility Test: |  |  |  |
| Top number Degrees Fahrenheit | 157.3 | 157.3 | 157.3 |
| Compatibility Delta Temp. Degrees F. | 1.7 | 1.7 | 1.7 |
| SHRP Testing: |  |  |  |
| Binder DSR | 81.1 | 80.9 | 84.3 |
| RTFO DSR | 78.1 | 78.1 | 81.5 |
| PAV DSR | 24.8 |  |  |
| M-value | −11.56 | −9.84 | −10.55 |
| S-value | −18.32 | −13.73 | −14.28 |
| SHRP Grade | PG76-16 | PG76-16 | PG76-16 |

TABLE 5

|  | 24 hour Aging, Method B | 24 hour Aging, Method A |
|---|---|---|
| Sample number | 958-61 | 958-62 |
| High Density Tower Residua wt % | 51 | 51 |
| AC-30 Asphaltenes wt % | 24.2 | 24.2 |
| Subtotal Asphalt wt % | 75.2 | 75.2 |
| Hydrolene H180T Oil wt % | 21 | 21 |
| Elastomer FP411 | 3.80 | 3.80 |
| Elastomer FP411 - % of Cross-linked Blend | 15.26 | — |
| Crosslinker - ZMBT wt % of Elastomer | 0.70 | 0.70 |
| Crosslinker - ZMBT wt % of Asphalt | 0.027 | 0.027 |
| Crosslinker - S wt % of Elastomer | 2.12 | 2.12 |
| Crosslinker - S wt % of Asphalt | 0.081 | 0.081 |
| Temperature | 380 | 380 |
| Mixer RPM | high shear | low shear |

TABLE 5-continued

|  | 24 hour Aging, Method B | 24 hour Aging, Method A |
| --- | --- | --- |
| Compatibility Test: | | |
| Top number Degrees Fahrenheit | 151.8 | 179.6 |
| Compatibility Delta Temp. Degrees F. | 1.1 | 2.3 |
| SHRP Testing: | | |
| Binder DSR | 80.5 | 87.7 |
| RTFO DSR | 76.1 | 83.5 |
| PAV DSR | 29 | 28.9 |
| M-value | −12.61 | −10.09 |
| S-value | −13.2 | −13.35 |
| SHRP Grade | PG76-22 | PG76-16 |

What we claim is:

1. A method for preparing asphalt and polymer compositions comprising:
preparing a crosslinking elastomer concentrate by adding thermoplastic elastomer and crosslinking agent to a suitable carrier oil and allowing the mixture to age from in excess of 2 hours to 24 hours;
heating the asphalt in a stirred tank to a temperature sufficient to allow stirring of the asphalt in the tank;
adding said crosslinking elastomer concentrate to the tank and continuing stirring for a period of time sufficient to improve the distribution of the crosslinking agent dispersion in the asphalt; and
aging the resultant composition from 12 hours to 48 hours.

2. The method of claim 1 wherein the asphalt is heated to a temperature from 360° F. to 400° F.

3. The method of claim 2 wherein the aging is performed at a temperature from 300° F. to 350° F.

4. The method of claim 1 wherein the asphalt is heated to a temperature not greater than 420° F. prior to the addition of the crosslinking elastomer concentrate.

5. The method of claim 1 wherein the thermoplastic elastomer is a styrene-butadiene polymer.

6. The method of claim 1 wherein the carrier oil comprises an aromatic oil comprised of naphthene and polar aromatic fractions exceeding 72% by weight.

7. The method of claim 1 wherein the carrier oil comprises an aromatic oil comprised of naphthene and polar aromatic fractions exceeding 80% by weight.

8. The method of claim 1 wherein the crosslinking elastomer concentrate comprises up to 18% by weight of elastomer.

9. The asphalt composition made in accordance with claim 1 wherein the asphalt properties comply with Federal standards for grade AC-20.

10. The method of claim 1 wherein the crosslinking agents comprise elemental sulfur and zinc compounds.

11. A method for preparing an asphalt and thermoplastic elastomer composition comprising the steps of:
A preparing an elastomer solution by adding thermoplastic elastomer to a suitable carrier oil in a stirred tank, continue stirring while heating the oil and thermoplastic elastomer for sufficient time and temperature to dissolve more than 80% by weight of the thermoplastic elastomer;
adding crosslinking agents to the solution to form a dispersion of crosslinking agents in the elastomer solution;
aging the dispersion of crosslinking agents in the elastomer solution in excess of 2 hours;
heating an asphalt cut in a stirred tank to a temperature of from 360° F. to 400° F.;
adding said dispersion of crosslinking agents in elastomer solution to the tank and continuing stirring for a period of time sufficient to improve the distribution of the crosslinking agent dispersion in the asphalt,
reducing the temperature of the resultant composition to 300° F. to 330° F., aging the resultant composition from 12 hours to 48 hours at the reduced temperature.

12. The method of claim 11 wherein the thermoplastic elastomer is a styrene-butadiene polymer.

13. The method of claim 11 wherein the carrier oil comprises an aromatic oil comprised of naphthene and polar aromatic fractions exceeding 72% by weight.

14. The method of claim 11 wherein the carrier oil comprises an aromatic oil comprised of naphthene and polar aromatic fractions exceeding 80% by weight.

15. The method of claim 11 wherein the elastomer solution comprises up to 18% by weight of elastomer.

16. The asphalt composition made in accordance with claim 11 wherein the asphalt properties comply with AASHTO standards for grade AC-20.

17. The method of claim 11 wherein the crosslinking agents comprise elemental sulfur and zinc compounds.

18. A method for preparing an asphalt and thermoplastic elastomer composition comprising the steps of: preparing an elastomer solution by adding from 8% to 18% by weight of a styrene-butadiene thermoplastic elastomer to a suitable carrier oil in a stirred tank; adding crosslinking agents to the solution to form a dispersion of crosslinking agents in the elastomer solution; aging the dispersion of crosslinking agents in the elastomer solution in excess of 2 hours; heating an asphalt cut in a stirred tank to a temperature from 360° F. to 400° F.; adding said dispersion of crosslinking agents in elastomer solution to the tank and continuing stirring for a period of time sufficient to improve the distribution of the crosslinking agent dispersion in the asphalt, aging the resultant composition from 12 hours to 48 hours.

19. The method of claim 18 wherein the carrier oil comprises an aromatic oil comprised of naphthene and polar aromatic fractions exceeding 72% by weight and the elastomer solution is stirred for sufficient time and at sufficient temperature to dissolve more than 80% by weight of the thermoplastic elastomer.

20. The method of claim 19 wherein the aging is performed at a temperature from 300° F. to 350° F.

\* \* \* \* \*